Dec. 10, 1929.    L. J. JAKUBOWSKI    1,739,033
HOT DISH REMOVING DEVICE
Filed March 20, 1929
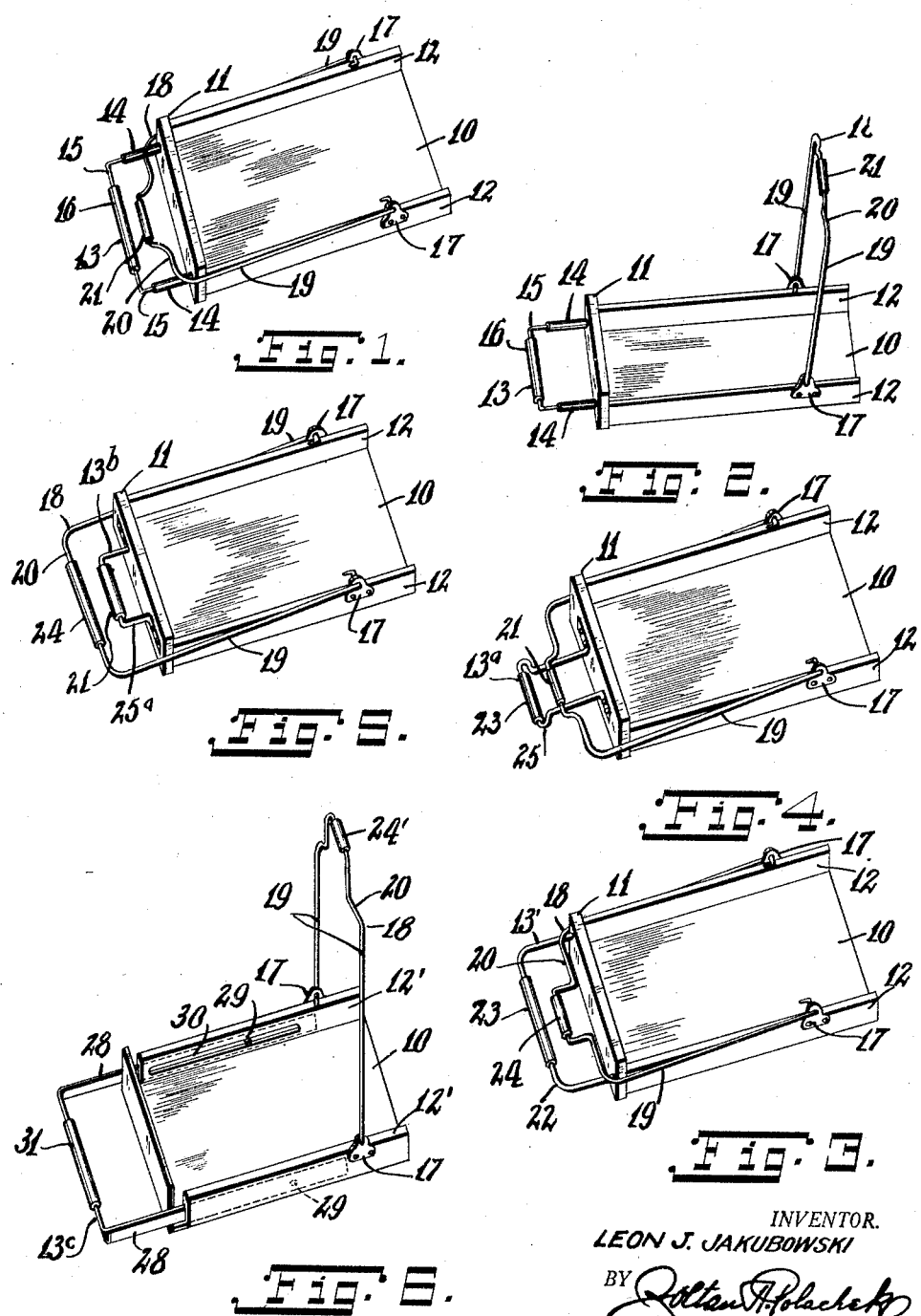
INVENTOR.
LEON J. JAKUBOWSKI
BY
ATTORNEY Patented Dec. 10, 1929

1,739,033

UNITED STATES PATENT OFFICE

LEON J. JAKUBOWSKI, OF NORWICH, CONNECTICUT

HOT-DISH-REMOVING DEVICE

Application filed March 20, 1929. Serial No. 348,414.

This invention relates generally to kitchen safety appliances and has more particular reference to a novel device for removing dishes from hot ovens.

The invention has for an object the provision of a device of the class mentioned, which is of simple durable construction, desirable in use and efficient in action, and which can be manufactured and sold at a reasonable cost.

The invention proposes the use of a scoop provided with a flat base, a vertical front and vertical sides, a stationary handle being secured upon the front face of the said vertical front, and handle supports being mounted on the top edges of the said vertical sides for supporting a movable handle adapted to assume a horizontal or a vertical position. In removing dishes from a hot oven it is intended to force the scoop beneath the dishes by handling with the stationary handle and after partially withdrawing the scoop from over the oven, moving the movable handle to a vertical position and thus insuring full support of the scoop.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:—

Fig. 1 is a perspective view of a device constructed according to this invention.

Fig. 2 is a similar view with the movable handle in a vertical position.

Fig. 3 is a view similar to Fig. 1, but disclosing a modified form thereof.

Fig. 4 is a similar view to Fig. 1, but disclosing a further modified form thereof.

Fig. 5 is a view similar to Fig. 1, but disclosing another modified form.

Fig. 6 is a view similar to Fig. 2, but disclosing a still further modified form of the device.

The reference numeral 10 indicates generally a flat base of a scoop having a vertical front 11 and vertical sides 12. A stationary handle 13 is secured upon the front face of the vertical front 11 and consists of longitudinal handles or posts 14 connected by a transverse wire 15 having a tube 16 secured at its center. Handle supports 17 are mounted upon the top edges of the said vertical sides 12 and connect with a movable handle 18 consisting of longitudinal arms 19 directly connected on one of their ends with the said handle supports and joined at their other ends by a transverse arm 20 provided with a tube 21 situated at its center.

For removing dishes from a hot oven the movable handle 18 is allowed to remain in a horizontal position as shown in Fig. 1. The dishes are forced upon the scoop by manipulating the device by manually grasping the stationary handle 13 and pushing it rearwards. After dishes have been slid upon the scoop, said scoop may be partially withdrawn off the oven by pulling forwards on the handle 13 and then the movable handle 18 is raised to a vertical position as illustrated in Fig. 2, for supporting the rear end of the device. A person holding both the handle 13 and the handle 18 may safely move the device to a table remote from the said hot oven.

In Fig. 3 a modified form of the device has been illustrated in which a stationary handle 13' has been shown consisting of a U-shaped wire 22 fixed upon the front face of the vertical front 11 and having a tube 23 on the bent portion of the said U-shaped wire. The movable handle 18 consists of longitudinal arms 19 engaging the handle supports 17 and provided with a transverse arm 20 having a tube 24 thereon. In Fig. 1 the movable handle rests upon the longitudinal posts 14 of the stationary handle and in Fig. 3 upon the wire 22.

In the modified form of the device illustrated in Fig. 4 a stationary handle 13" has been shown consisting of a U-shaped wire 25, with arms exceptionally closed relative to the arms of the U-shaped wire 22 illustrated in Fig. 3. A tubular member 23 is engaged upon the bend of the U-shaped wire 25. A movable handle 18 similar to that illustrated in Fig. 1, rests upon the arms of the said U-shaped wire 25.

In the modified form of the device illustrated in Fig. 5, a U-shaped member 25ª of a smaller length than the member 25 in Fig. 4 is shown attached upon the front face of the front vertical end 11 of the scoop. The movable handle 18 extends materially in front of the stationary handle 13ᵇ constituting the said U-shaped member 25ª and a tube 21.

In the modified form illustrated in Fig. 6, the vertical sides 12' of the scoop are formed by turning up the edges of the flat base 10 and then turning a portion thereof downwards.

A horizontal handle 13ᶜ has longitudinal arms 28 slidably engaged within the vertical sides 12'. Pins 29 project from the longitudinal portions of the handle and engage in elongated slots 30 in the said vertical sides for limiting the horizontal movement of the handle. The movable handle 18 is the same as that described relative to the previous forms of the device. A long tubular member 31 is engaged upon in the transverse portion of the horizontal handle 13ᶜ. The advantage of the movable horizontal handle consists in that when the scoop is forced beneath hot dishes the pins 29 act against the rear ends of the slot 30 and when the handle 13ᶜ is drawn completely outwards the pins 29 act against the front of the slots 30 before movement of the scoop body.

In operation of the device dishes upon a hot stove may be forced upon the flat base of the scoop by pushing the scoop rearwards by means of the stationary handle 13. After the dishes have thus been forced upon the flat base of the scoop it may be pulled forwards and then the movable handle may be raised to its vertical position. The device may then be transferred to a table by manually supporting it at its stationary handle and at its movable handle in the raised position.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A device for removing dishes from a hot oven, comprising a scoop with a stationary front handle and a movable handle mounted on the sides of the scoop, and arranged for assuming a horizontal and a vertical position, in a horizontal position the movable handle being capable of resting upon the stationary handle.

2. A device for removing dishes from a hot oven, comprising a scoop having a flat base, a vertical front and vertical sides, a stationary handle mounted on the front face of the vertical front, handle supports mounted on the top of said vertical sides, and a movable handle pivotally mounted on the handle supports and provided with longitudinal arms pivotally connected on the handle supports and a transverse arm connected between the longitudinal arms and arranged for resting upon the stationary handle when the movable arm is in a horizontal position.

3. A device for removing dishes from a hot oven, comprising a scoop having a flat base, a vertical front and vertical sides, a stationary handle mounted on the front face of the vertical front, handle supports mounted on the top of said vertical sides, and a movable handle pivotally mounted on the handle supports and provided with longitudinal arms pivotally connected on the handle supports and a transverse arm connected between the longitudinal arms and arranged for resting upon the stationary handle when the movable arm is in a horizontal position.

4. A device for removing dishes from a hot oven, comprising a scoop having a flat base, a vertical front and vertical sides, a stationary handle mounted on the front face of the vertical front, handle supports mounted on the top of said vertical sides, and a movable handle pivotally mounted on the handle supports and provided with longitudinal arms pivotally connected on the handle supports and a transverse arm connected between the longitudinal arms and arranged for resting upon the stationary handle when the movable arm is in a horizontal position, said handle supports project above the top edges of the vertical sides.

5. A device for removing dishes from a hot oven, comprising a scoop having a flat base, a vertical front and vertical sides, a horizontal handle slidably mounted in the sides and disposed before the front face of the vertical front, handle supports mounted on the top of said vertical sides, and a movable handle pivotally mounted on the handle supports and provided with longitudinal arms pivotally connected on the handle supports and a transverse arm connected between the longitudinal arms and arranged for resting upon the horizontal handle when the movable arm is in a horizontal position, said horizontal handle having projecting pins engaging in slots in the vertical sides to limit its horizontal motion.

In testimony whereof I have affixed my signature.

LEON J. JAKUBOWSKI.